(12) United States Patent
Arimoto et al.

(10) Patent No.: US 6,597,118 B2
(45) Date of Patent: Jul. 22, 2003

(54) HIGH-PRESSURE MERCURY LAMP LUMINESCENT DEVICE AND MEANS OF IGNITION

(75) Inventors: Tomoyoshi Arimoto, Tatsuno (JP); Masashi Okamoto, Akashi (JP); Izumi Takaya, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/809,086

(22) Filed: Mar. 16, 2001

(65) Prior Publication Data

US 2002/0047610 A1 Apr. 25, 2002

(30) Foreign Application Priority Data

Mar. 17, 2000 (JP) .......................... 2000-075434
Nov. 2, 2000 (JP) .......................... 2000-335804

(51) Int. Cl.$^7$ .......................... H01J 13/32; H01J 17/20
(52) U.S. Cl. .......................... 315/115; 315/291; 313/639
(58) Field of Search .......................... 315/291, 105, 315/106, 107, 114, 115; 313/571, 634, 639, 15, 568, 572, 576, 632, 633; H01J 13/32, 17/20

(56) References Cited

U.S. PATENT DOCUMENTS

| | | | |
|---|---|---|---|
| 4,398,123 A | * 8/1983 | Tsuchihashi et al. | 315/46 |
| 4,797,598 A | * 1/1989 | Oikawa et al. | 315/85 |
| 4,798,997 A | * 1/1989 | Egami et al. | 315/115 |
| 4,899,085 A | * 2/1990 | Kimura et al. | 315/116 |
| 5,051,649 A | * 9/1991 | Waymouth | 313/15 |
| 5,109,181 A | * 4/1992 | Fischer et al. | 313/571 |
| 5,497,049 A | 3/1996 | Fischer | 313/364 |
| 5,909,085 A | * 6/1999 | Nelson | 315/94 |
| 6,084,352 A | * 7/2000 | Seki et al. | 313/635 |
| 6,486,603 B1 | * 11/2002 | Ikeuchi et al. | 313/639 |

FOREIGN PATENT DOCUMENTS

| | | |
|---|---|---|
| JP | 51-006379 A | 1/1976 |
| JP | 63-024543 A | 2/1988 |
| JP | 05-082097 A | 4/1993 |

* cited by examiner

Primary Examiner—Don Wong
Assistant Examiner—Trinh Vo Dinh
(74) Attorney, Agent, or Firm—Nixon Peabody LLP; David S. Safran

(57) ABSTRACT

To provide a high-pressure mercury lamp capable of shortening the light output rise time and of preventing glow discharge that occurs when the lamp is lighted, a high-pressure mercury lamp (1) luminescent device with a pair of electrodes (6, 7) placed opposite one another within a discharge vessel (2) made of quartz glass with seals (4, 5) formed on both ends and at least 0.15 mg/mm$^3$ of mercury sealed into the discharge vessel, has a device (11, 12) for increasing the temperature of the outer wall of the luminescent portion (3) of the discharge vessel (2) to at least 100° C. before the high-pressure mercury lamp is lit.

10 Claims, 10 Drawing Sheets

HIGH-PRESSURE MERCURY LAMP LUMINESCENT DEVICE AND MEANS OF IGNITION

BACKGROUND OF THE INVENTION

1. Field of the Invention

This invention relates to a high-pressure mercury lamp, and particularly to a high-pressure mercury lamp with at least 0.15 mg/mm$^3$ of mercury sealed into the discharge vessel so as to have a pressure of well over 100 atmospheres when lit for use as a back light in liquid crystal projectors or projection-type liquid crystal display equipment.

2. Description of Related Art

Projection-type liquid crystal display equipment is required to project an image on a rectangular screen, evenly and with good brightness, efficiency and color characteristics. For that reason, metal halide lamps, in which are sealed mercury and a metal halide, are commonly used as light sources. In recent times, these metal halide lamps have come to have very small inter-electrode gaps, making them smaller and more nearly point light sources.

Against this backdrop, high-pressure mercury lamps, having well over 100 atm. of mercury vapor pressure when lit, have been proposed to replace metal halide lamps. Making the mercury vapor pressure higher is intended to suppress the spread of the arc and make the light output even higher. Examples include U.S. Pat. No. 5,109,181 (JPO kokai patents H2-148561) and U.S. Pat. No. 5,497,049 (H6-52830).

For high-pressure mercury vapor lamps of this sort to achieve high brilliance, high efficiency and good color characteristics, it is necessary to have a mercury vapor pressure well over 100 atmospheres, and so at least 0.15 mg/mm$^3$ of mercury must be sealed into the discharge vessel. In this way, after the lamp has been started up, mercury that is reserved in the light emission tube in liquid form is heated and vaporizes; several minutes of time is required for the vapor pressure to rise and bring the light output to the desired level. This phenomenon is one which did not arise to a noticeable extent in low-pressure mercury lamps or in conventional high-pressure mercury lamps in which the mercury vapor was not high enough (internal pressure up to 80 atmospheres when lit, for example.) Moreover, a glow discharge generally occurs when a discharge lamp is started up, but the high cathode drop voltage causes sputtering of the tungsten that makes up the cathode; the tungsten adheres to the inside wall of the discharge vessel, and the light output of the lamp is reduced. That is a problem in terms of the longevity of short-arc, high-pressure mercury lamps

SUMMARY OF THE INVENTION

Accordingly, the problem to be resolved by this invention is the provision of a high-pressure mercury lamp luminescent device, with a method of ignition, that shortens the rise time of the light output and enables prevention of a glow discharge when the lamp is started up.

This problem is solved in accordance with a first aspect of the present invention by using a high-pressure mercury lamp luminescent device with a pair of electrodes placed opposite one another within a discharge vessel made of quartz glass with seals formed on both ends and at least 0.15 mg/mm$^3$ of mercury sealed into the discharge vessel, in which there is a means of increasing the temperature of the outer wall of the luminescent portion of the discharge vessel to at least 100° C. before the high-pressure mercury lamp is lit.

In accordance with one specific form of the invention, the high-pressure mercury lamp luminescent device with a pair of electrodes placed opposite one another within a discharge vessel made of quartz glass with seals formed on both ends and at least 0.15 mg/mm$^3$ of mercury sealed into the discharge vessel, has a conductive heater wrapped around the seals of the discharge vessel and there is a means of passing electricity through the conductive heater and thus controlling the temperature of the outer wall of the luminescent portion of the discharge vessel at or above the desired temperature before the high-pressure mercury lamp is lit. More specifically, the conductive heater is wrapped around one seal of the discharge vessel, then straddles the luminescent portion of the discharge vessel by means of a metallic wire and wraps around the other seal, and the conductive heater being connected electrically to one of the external leads of the high-pressure mercury lamp, especially, the external lead on the cathode side of the high-pressure mercury lamp.

Furthermore, in accordance with another feature of the invention, a lamp power supply circuit provided to ignite the high-pressure mercury lamp, is used to supply power to the heater to increase the temperature of the outer wall of the luminescent portion of the discharge vessel before the high-pressure mercury lamp is lit.

In accordance with another aspect of the invention, a heater is wrapped around at least the seal on the cathode side and one end of the heater faces the cathode through the seal, the other end of the heater being connected electrically to the cathode, such that when power is supplied to the heater, the high potential side of the heater voltage is impressed on the other end of the heater.

The invention also provides the possibility of applying heating before the high-pressure mercury lamp is lit and while it burns.

In accordance with yet another feature of the invention, by the lamp power supply circuit and the heater power supply circuit being powered by the same power source, the output from the heater power supply circuit can be controlled such that the total power output of the two circuits does not exceed a specified value.

Furthermore, a detection means can be provided that detects the temperature of the luminescent portion, and stops the supply of power to the heater when the temperature passes a specified value.

With a method of lighting a high-pressure mercury lamp luminescent device with a pair of electrodes placed opposite one another within a discharge vessel made of quartz glass with seals formed on both ends and at least 0.15 mg/mm$^3$ of mercury sealed into the discharge vessel according to the invention, it is possible to increase the temperature of the outer wall of the luminescent portion of the discharge vessel to at least 100° C. before the high-pressure mercury lamp is lit.

With this invention, it is possible to shorten the rise time of the light output of the high-pressure mercury lamp, and also to prevent the glow discharge that occurs when a high-pressure mercury lamp is lit. Specifically, a high-pressure mercury lamp within which at least 0.15 mg/mm$^3$ of mercury is sealed, and the outer surface of the luminescent portion of the discharge vessel is heated to at least 100° C. before lighting, so that it is possible to fully vaporize the mercury in the discharge vessel before ignition. Following dielectric breakdown when the lamp is lit, the mercury vapor pressure within the discharge vessel will have risen adequately. It is therefore possible to shorten the rise time of the light output of the high-pressure mercury lamp, and to prevent the glow discharge that occurs when a high-pressure mercury lamp is lit.

As a heating means, a conductive heater is wrapped around the seals of the discharge vessel and electricity is passed through it to constitute a conductive heater. In this way, it is possible, with a simple structure, to control the temperature of the outer wall of the luminescent portion of the discharge vessel at or above the desired temperature, which is at least 100° C., before the high-pressure mercury lamp is lighted.

The heating means can be constituted by having a conductive heater wrap around one seal of the discharge vessel, then straddle the luminescent portion of the discharge vessel by means of a metallic wire and wrap around the other seal, with the conductive heater connected electrically to one of the external leads of the high-pressure mercury lamp. In this way it is possible to make the metallic wire that straddles the luminescent portion work as a trigger wire before lighting. In other words, the passage of electricity to the conductive heater is stopped prior to lighting, but the heater is connected electrically to one of the external leads, the dielectric breakdown voltage that lights the discharge lamp is impressed on the metallic wire as well, and that can easily work as a trigger wire and begin the lighting. That is, by heating the inside of the luminescent portion in advance, before starting up the lamp, it is possible to vaporize the mercury inside, and thus, have the metallic wire, which connects to the conductive heater used for heating, function as a trigger wire.

By having the conductive heater connected electrically to the external lead on the cathode side of the high-pressure mercury lamp, to impress on the outer surface of the seal at the base of the cathode the same potential that is on the external lead when the lamp is burning steadily, it is possible to enhance the lamp's resistance to pressure.

With a heater installed to increase the temperature of the outer wall of the luminescent portion of the discharge vessel to at least 100° C. before the high-pressure mercury lamp is lit, and with the power to the heater is supplied by the lamp power supply circuit, it is possible to vaporize the mercury within the discharge vessel beforehand, and to have the light output of the high-pressure mercury lamp rise quickly when the lamp is lighted. It is possible, moreover, to effectively prevent the unwanted glow discharge that is liable to occur when the lamp is ignited. In addition, there is no need for separate circuitry to heat the heater, and so a reduction of cost can be realized.

When the heater is wrapped around at least the seal on the cathode side of the electrodes, and one end of the wrapped heater faces the cathode through the seal, the other end of the heater being connected electrically to the cathode, when power is supplied to the heater, the high potential side of the heater voltage is impressed on the other end of the heater. Therefore, the anode has a higher potential than the facing end of the heater, which makes it possible to prevent deterioration of the lamp's resistance to pressure.

By having the heater power supply circuit installed to heat the outer wall of the luminescent portion of the discharge vessel to at least 100° C. before the high-pressure mercury lamp is lit and while it burns, in this way, it is possible to have the lamp power supply circuit and the heater power supply circuit operate independently and simultaneously. Thus, while the lamp lighting operation is in progress, power can be passed through the heater and continue to raise the temperature within the discharge vessel. This hastens the vaporization of the mercury, and can further hasten the increasing brightness of the high-pressure mercury lamp.

When the lamp power supply circuit and the heater power supply circuit are powered by the same power source, and the output from the heater power supply circuit is controlled such that the total power output by the two circuits does not exceed a specified value, it is possible to hold down the power supply capacity of the power source, to reduce the size and weight of the equipment, and to lower the cost. If the power supply capacity of the power source is held down, the time required to reach the final standard brightness is lengthened, but there is hardly any change in the time needed for the brightness of the high-pressure mercury lamp to reach a practical light output.

With a detector is installed to detect the temperature of the luminescent portion, and stop the supply of power to the heater when the temperature reaches a specified value, it is possible to control the feed of power to the heater, so that a given amount is supplied in the event that operation begins when the high-pressure mercury lamp has begun to cool off, and it is possible to shorten or completely eliminate the feed of power to the lamp in the case of re-ignition a relatively short time after it has been extinguished. Thus, the wasted consumption of power is suppressed, and it is possible to prevent the deterioration of heater longevity that would result from melt-through and oxidation as would result from excessive heating of the heater.

DETAILED DESCRIPTION OF THE INVENTION

Figure 1:
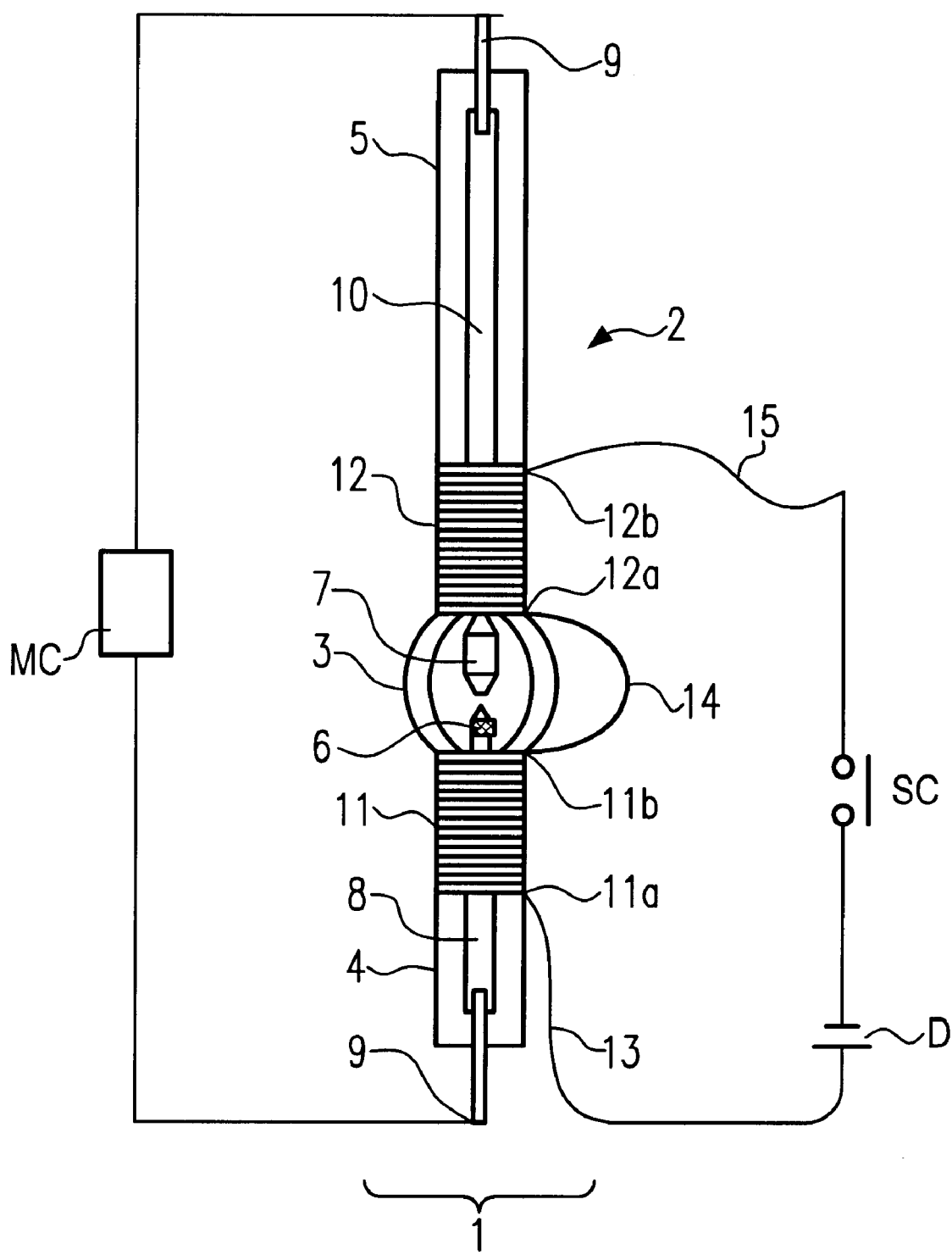
FIG. 1 shows the structure of the high-pressure mercury lamp and circuitry of the a first embodiment of this invention.

FIG. 1 shows the structure and circuitry of the high-pressure mercury lamp pertaining to the first embodiment of this invention in which a high-pressure mercury lamp 1 (also called the lamp hereafter) is of the direct current ignition type. It has a discharge vessel 2 molded of quartz glass, and comprises an elliptical luminescent portion 3 that forms the luminescent space, and a rod-shaped cathode-side seal 4 and anode-side seal 5 extend outward from opposite sides of the luminescent portion 3.

In the luminescent portion 3, there are located, along the tube axis of the discharge vessel 2, a cathode 6 and an anode 7 that face each other with an inter-electrode distance of 2.0 mm, for example. The axis (not illustrated) of the cathode 6 extends within the seal 4, and is connected to an external lead 9 through a metallic foil 8 that is completely sealed within the seal 4.

The structure is the same for the anode 7. In the drawing, 10 is the metallic foil on the anode side. Mercury is sealed into the luminescent portion 3 as the luminescent substance, and a rare gas, such as argon or xenon, is sealed in as the ignition-starting gas. The rare gas is included at a pressure of $1.3 \times 10^4$ Pa, for example. The amount of mercury included must be at least 0.15 mg/mm$^3$; that amount will provide a mercury vapor pressure well over 100 atmospheres during stable lighting.

To introduce one example of such a high-pressure mercury lamp, the greatest external diameter of the luminescent portion is 12.0 mm, the greatest internal diameter is 7.5 mm, the length of the luminescent space (the length along the axis of the lamp) is 12.5 mm, the amount of mercury included is 50 mg, the volume of the luminescent space is 260 mm$^3$, the internal surface area of the luminescent space is 250 mm$^2$, the load on the tube wall is 0.8 W/mm$^2$, the rated power is 200 W, and the inter-electrode distance is 1.5 mm.

The lamp 1 has a means of heating both the cathode-side seal 4 and the anode-side seal 5, such as wrapping all or a portion of the seals 4, 5 with a metallic wire 11, 12 as a conductive heater.

The end 11a of the metallic wire 11 wrapped around the seal 4 is connected electrically to a heater power source D by a metallic wire 13, and the other end 11b of the metallic wire 11 is connected electrically to the end 12a of the metallic wire 12 that is on the seal 5; the other end 12b of the metallic wire 12 on the seal 5 is connected by a metallic wire 15 to the circuit SC and the heater power source D. In other words, the discharge vessel 2 is heated by providing power to metallic wires 11, 12 through metallic wires 13, 14, 15.

In the constitution described above, first the discharge vessel 2 is heated by supplying power to metallic wires 11, 12 by the circuit SC that controls the wires 11, 12. This circuit is separate from the main lighting circuit MC of the lamp 1. Then, when a thermocouple, radiant thermometer or other temperature detector (not illustrated) detects that the outer wall of the luminescent portion 3 has reached a specified temperature, such as 250° C., the circuit SC stops supplying power to the metallic wires 11, 12, and the heating of the discharge vessel 2 ends.

That specified temperature will vary depending on the amount of mercury included and the volume of the luminescent portion, but it must be at least 100° C. That is, by raising the temperature of the outer wall of the luminescent portion to at least 100° C. before the lamp is lit, it is possible to vaporize the mercury within the discharge vessel 2 in advance. Because of that, the light power will rise quickly, and the undesirable glow discharge that is liable to occur during ignition can be effectively stopped.

With regard to the value 100° C., the present inventors made various studies and confirmed that in a small high-pressure mercury lamp with a luminescent portion volume of 300 mm$^3$ and mercury vapor pressure well over 100 atmospheres when lit, raising the temperature of the outer surface of the luminescent portion to at least 100° C. makes it possible to substantially vaporize the mercury within the luminescent portion, so that the light output rises quickly in a practical sense, and essentially no undesirable glow discharge occurs.

After heating the outer surface of the luminescent portion of this type of high-pressure mercury lamp to at least 100° C. before lighting, heating is stopped, and power is supplied to the lamp 1 by the main lighting circuit MC, and lighting begins by means of dielectric breakdown between the electrodes of the lamp 1.

In this embodiment, before lighting of the lamp 1, the discharge vessel 2 is heated by supplying power to metallic wires 11, 12 by the circuit SC that controls the wires 11, 12. This circuit is separate from the main lighting circuit MC of the lamp 1. Therefore, when lighting begins, the temperature of the luminescent portion 3 will have risen already, and the vapor pressure of the mercury will have risen accordingly, and so the light output will rise more quickly after lighting than it would if the discharge vessel 2 had not been heated before lighting.

Figure 5:
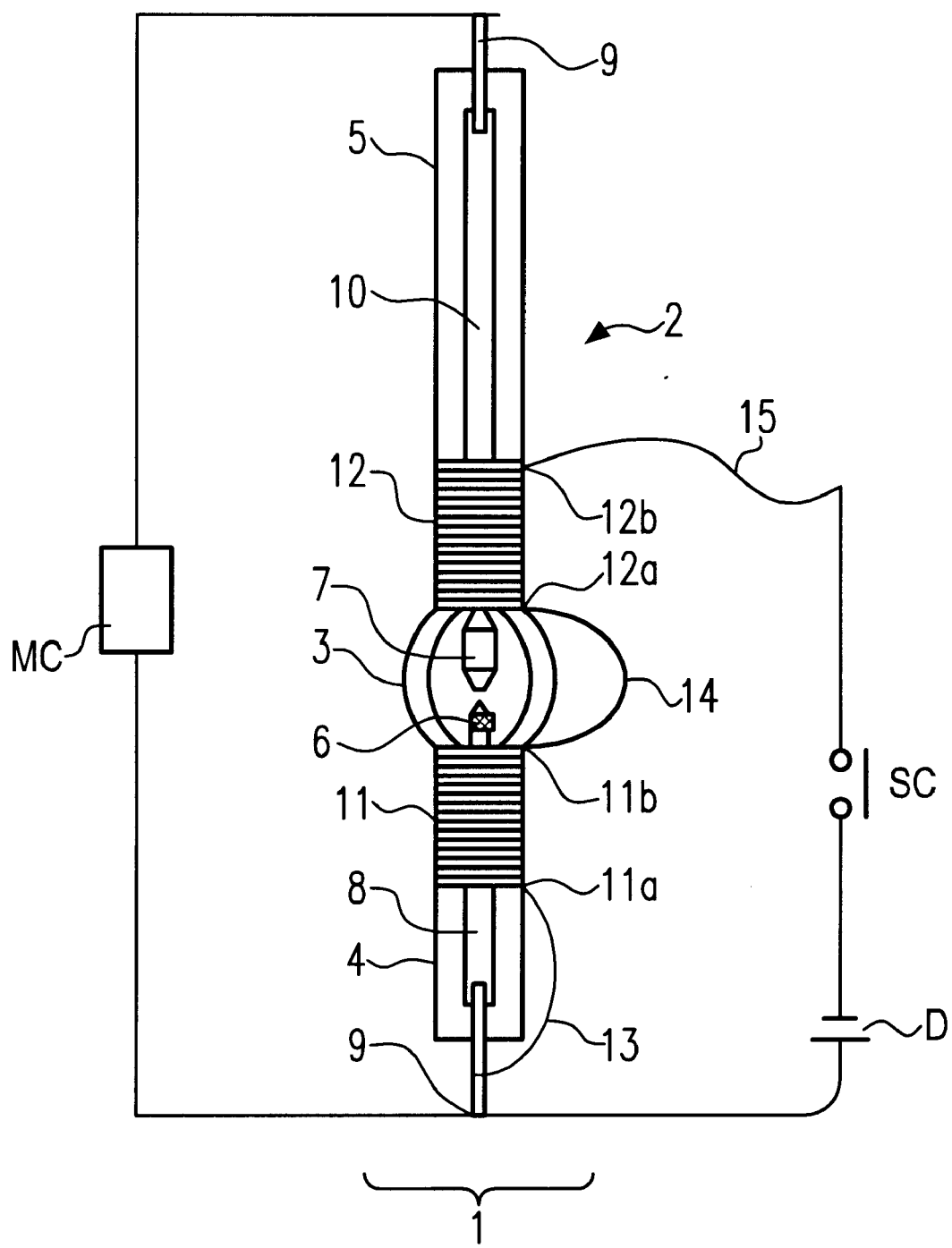
FIG. 5 shows the structure of the high-pressure mercury lamp and circuitry of a second embodiment of this invention.

Now, in the embodiment described above, the heating circuit SC and the main lighting circuit MC are constituted completely separately, but it is possible to have the conductive heater electrically connected to the external lead 9 of at least one seal, as shown in FIG. 5. With that constitution, there are conductive heaters on both seals 4, 5 of the discharge vessel 2, and a metallic wire 14 that straddles the luminescent portion 3. Therefore, even after the means of heating has been stopped, it is possible to impress a high voltage on the metallic wire 14 during the lamp lighting, and it is possible for the metallic wire 14 to function as a trigger wire to improve the ignition characteristics of the lamp. Specifically, impressing a pulsed high voltage with a peak voltage of 10 plus KV across the electrodes of the lamp during lighting will cause dielectric breakdown of the gas between the discharge electrodes; because the metallic wire 14, which is connected to and has the same potential as the one of the external leads, is located next to the luminescent portion, this facilitates ignition. Compared with a case in which there is no such trigger wire, this arrangement allows dielectric breakdown between the electrodes with a lower voltage pulse.

In the embodiment shown in FIG. 5, fusing, wrapping or otherwise making an electrical connection to the external lead 9 at the cathode-side seal 4 is more effective for the reason stated below. That is, the end 11a of the metallic wire 11 located at the seal 4 is connected electrically to the external lead 9, and thus, is connected electrically to the main lighting circuit MC as well. Because of that constitution, the conductive heater on the cathode-side seal 4, which is the metallic wire 11, functions as an equipotential wire. The cathode stem (not illustrated) that is enclosed in the cathode-side seal 4 and the cathode-side metallic foil 8, made of molybdenum, have a negative potential during stable lighting of the lamp, and so they attract any sodium, potassium or other alkali components. When these alkali components at the boundary between the molybdenum cathode-side metallic foil 8 and the quartz seal, they interrupt the bond between the molybdenum cathode-side metallic foil 8 and the quartz seal, lowering the strength of the bond between the two and thus the pressure resistance of the lamp itself.

However, if the metallic wire 11 is wrapped around the outer surface of the cathode-side seal 4 and is connected electrically to the cathode-side seal 4, during stable lighting of the lamp, the potential of the metallic wire 11 on the outer surface of the cathode-side seal 4 will be lower than that of the cathode stem within the cathode-side seal 4 by the extent of the voltage drop due to the current flowing through the cathode-side molybdenum foil 8 and the cathode stem within the cathode-side seal 4. The alkali components mentioned above are pushed to the outer surface of the cathode-side seal 4. Accordingly, the problem of reduced lamp pressure resistance is avoided.

To return to discussion of the conductive heater of this invention, the technology of coating the outer surface of the luminescent portion with a heat-insulation layer has existed for some time. This invention, however, has designed a constitution that actively heats the luminescent portion of the discharge lamp and also has a means to stop that heating, and so such things as coating with an insulation layer, which do not have such heat and stop functions, do not belong in the range of technology of this patent application.

Moreover, this invention does not heat the seals of the discharge vessel or the electrodes within the discharge vessel, but are intended to heat the discharge space by means of heating the luminescent portion. Various methods and mechanisms can be applied as the means for that, but the intention is not to provide a means of partially heating the contents of the discharge vessel. Accordingly, conventional means that heat only one seal or spread an insulation layer over the side of one electrode do not belong in the range of technology of this patent application.

The effect of using this sort of reserve heating mechanism is explained next. For example, in the case of a direct current, a 200 W high-pressure mercury lamp that encloses 50 mg of mercury in the luminescent portion (volume 260 mm$^3$), when the lamp 1 is started without heating the discharge vessel 2 in advance, it takes about 90 seconds before the light output reaches 90% of the stable lighting value. However, if the discharge vessel 2 is heated in advance until the coldest part of the luminescent portion is about 250° C. before the high-pressure mercury lamp is ignited, the rise time until the light output reaches 90% of the stable lighting value is shortened to about 20 seconds.

Moreover, if the lamp 1 is lit after heating the discharge vessel 2 in advance has raised the temperature of the luminescent portion 3 and raised the vapor pressure of the mercury correspondingly, the glow discharge that occurs during lighting at room temperature is prevented completely. In other words, the blackening of the inner wall of the luminescent portion that arises from the sputtering of the cathode material caused by the glow discharge is prevented completely, and the lowering of the light output of the lamp 1, which normally progresses with the number of times lighting occurs, is also prevented completely.

Figure 2A:
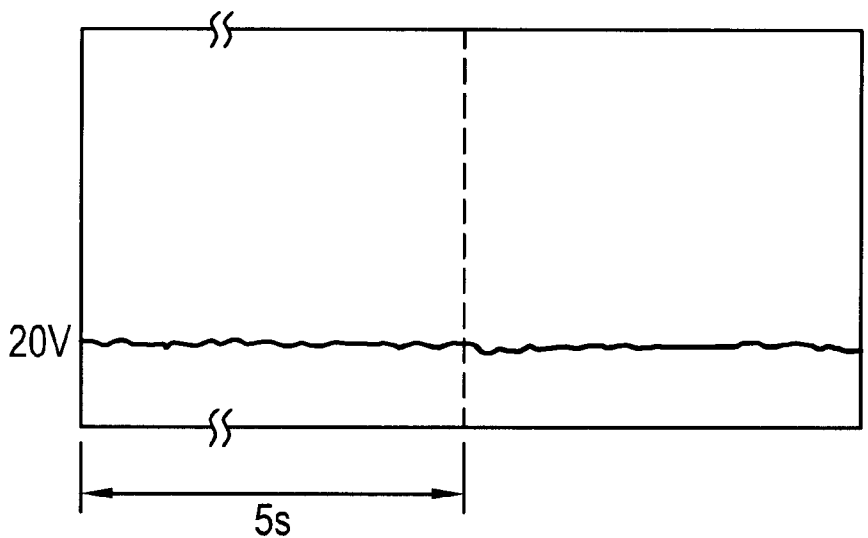
FIGS. 2($a$) & 2($b$) are diagrams showing the lamp-voltage waveform of the high-pressure mercury lamp during lighting.
Figure 2B:
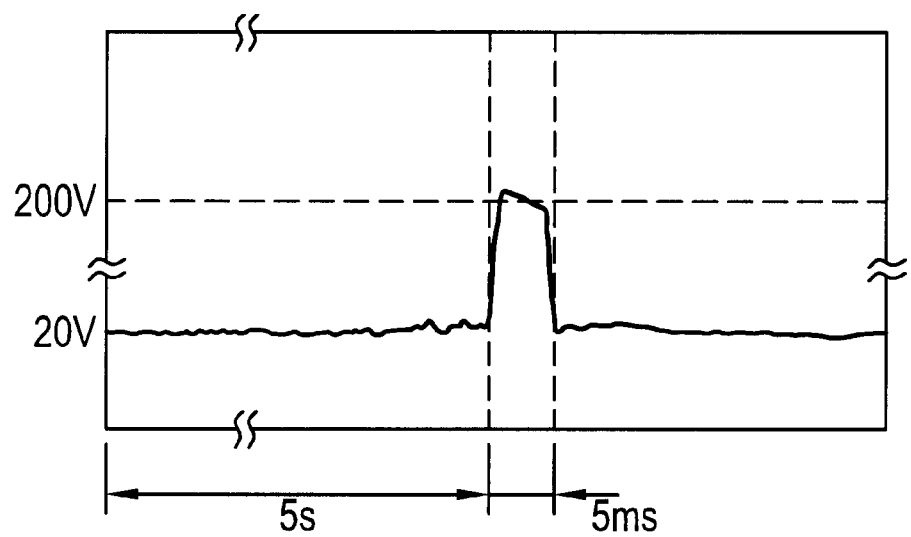

FIGS. 2(*a*) & 2(*b*) show a comparison of the lamp voltage waveform during lighting for the direct current, 200 W lamp mentioned above, and a case in which the discharge vessel 2 is not heated before lighting.

In the case where the discharge vessel 2 is heated before lighting, as shown in FIG. 2(*a*), a change in the waveform is recognized a mere 5 seconds after lighting, but that is due to a change of the discharge potential on the coil of the cathode; there is no occurrence of glow discharge.

By contrast, in the case where the discharge vessel 2 is not heated before lighting, as shown in FIG. 2(*b*), after 5 seconds, the lamp voltage changes to exceed 200 V for 5 ms; this is considered to result from the occurrence of glow discharge.

Now, a metallic wire is used as the means of heating in this embodiment, but that is not the only possible means; the heating can be done with a heat-generating object, such as a silicon rubber heater, a sheathe heater or other resistance heater, or by optical heating using a halogen heater. Also, direct current lighting is used in the high-pressure mercury lamp of this implementation, but the alternating current type can be used as well.

In this embodiment, metallic wire is used as the heating means on the seals on both sides of the discharge vessel; that is suitable both for horizontal lighting or vertical lighting. In the case of vertical lighting, it is not necessary to have the heating means on the seals on both ends; considering the gas convection within the discharge vessel, the temperature of the luminescent portion can be raised effectively with a heating means on one seal. For example, in vertical lighting with the cathode in the lower position, the full action and effect of this invention can be obtained with a means of heating on the cathode-side seal only.

Moreover, in this embodiment, the temperature of the coldest part of the luminescent portion is detected by means of a thermocouple, radiant thermometer, or other temperature detector, but it is not limited to that method; it is possible to determine in advance the relationship between the amount of injected power to reach the desired temperature and the time required to inject that power, and then determine the temperature by the passage of time.

The lighting method of the high-pressure mercury lamp of this invention is to raise the outer surface of the luminescent portion to a specific temperature prior to lighting, specifically to a temperature above 100° C. at which the mercury within the discharge vessel will vaporize adequately, or more specifically to about 250° C. A waiting mode use and a warm operation mode are described below as examples.

In the waiting mode, the lamp is not lit, but the heating means continues to feed a volume of heat such that the temperature of the outer surface is saturated at a level of 100° C. or higher. This heating by the heating means is stopped just prior to lighting the lamp, and then the lamp is lit. In other words, the means of heating always functions except when the lamp is lit, and so it is possible to have the light output rise in a short time, no matter when the lamp is ignited.

In such a waiting mode, if the lamp is rated at 200 W and has metallic wire conductive heaters on the seals at both ends, about 30 W of waiting mode power will be necessary to maintain the outer surface of the luminescent tube at 250° C. Because the mercury has been maintained at a temperature adequate for vaporization when the lamp is ignited, the rise of light power after ignition is shortened by about 20 seconds, compared with the case of no heating before lighting. In the case of lamps used in projector equipment, the benefits of reaching the desired light output in 20 seconds less is significant, even though it requires 30 W of power while waiting.

Next is the warm operation mode, in which the outer surface of the luminescent portion is heated for a specified time prior to lighting the lamp, after which the lamp is lit. That is, unlike the waiting mode described above, the heating means is not functioning constantly; when the lamp is to be lit, the means of heating operates prior to ignition. This may be slower than the waiting mode in terms of rise time, but it does not consume power during the waiting time, and it similarly solves the glow discharge problem because lamp ignition occurs when the mercury within the discharge vessel is in a vaporized state.

To give an example, if heating is done by passing about 150 W of power through conductive heaters on both seals of a lamp with a rated power of 200 W, the mercury within the discharge chamber can be completely vaporized in about 10 seconds. Compared with the case without a heating means, the rise of light power after ignition is shortened by about 20 seconds, and so considering the 10 seconds of heating before ignition, this is a savings of about 10 seconds.

Figure 3:
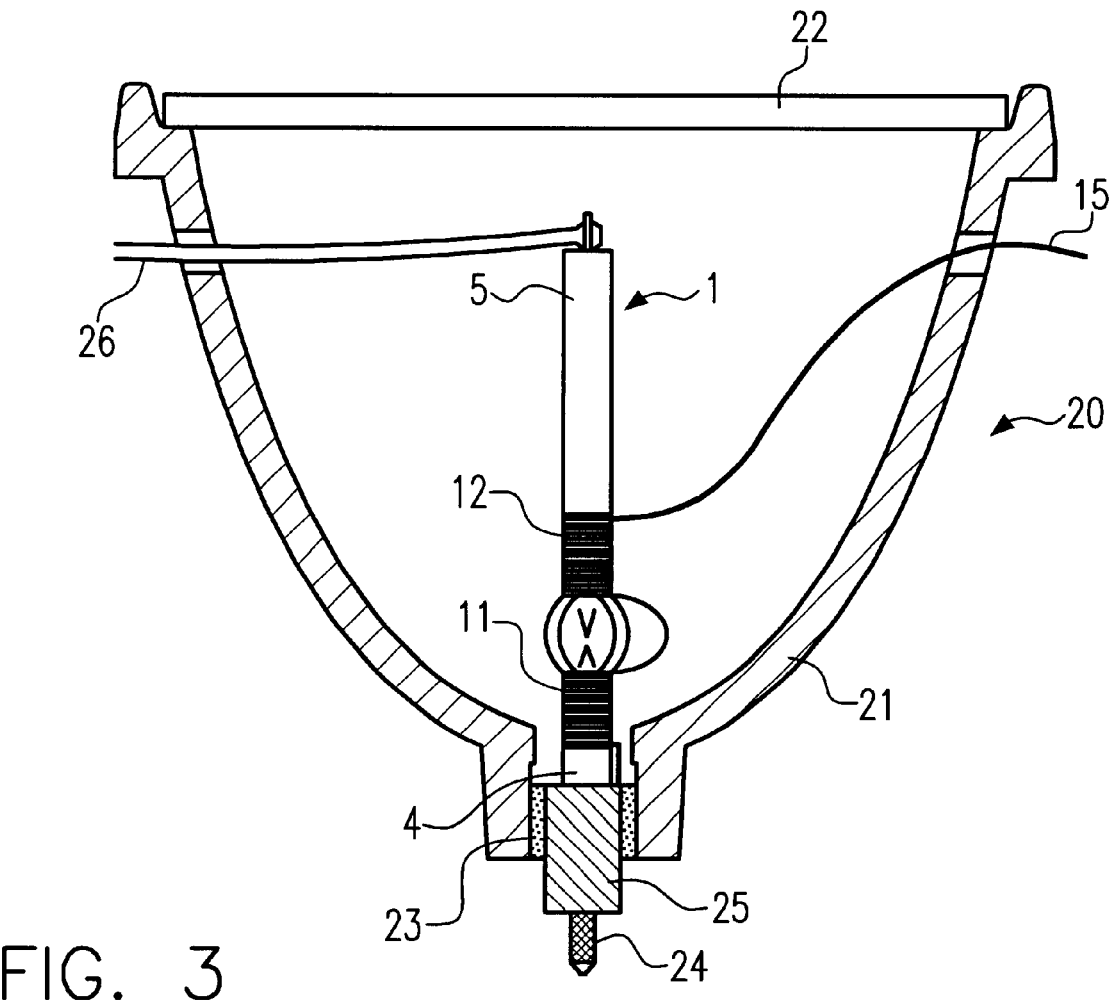
FIG. 3 is a cross-sectional view of the structure of a lamp unit using the high-pressure mercury lamp of this invention.

FIG. 3 shows the construction of the lamp unit of the second embodiment of this invention. A concave reflector mirror 21 is attached to the lamp 1 of this invention, and a front cover 22 of transparent material is attached to the front opening of the concave reflector mirror 21. The cathode-side seal 4 of the lamp 1 projects from the apex of the concave reflector mirror 21, and is supported by the concave reflector mirror 21 acting through adhesive 23. A base fitting 25 with a terminal screw 24 is also attached to the cathode-side seal 4 of the discharge vessel 2 of the lamp 1, and is connected to the external lead 9 of the cathode-side seal 4. In addition, there are two openings in the side of the concave reflector mirror 21; the metallic wire 15 that feeds power to the metallic wires 11, 12 pass through one opening, and a power supply wire 26 that feeds power to the lamp 1 passes through the other opening.

By means of the constitution described above, the metallic wires 11, 12 are supplied power from the terminal screw 24 and the metallic wire 15, and the lamp 1 is supplied power from the terminal screw 24 and the power supply 26.

The concave reflector mirror 21 is made of a hard, heat-resistant glass, such as borosilicate glass, and the radiant surface is, for example, an elliptical surface. The front opening is, for example, rectangular in shape. The inner surface of the concave reflector mirror 21 comprises a multi-layer dielectric, such as alternating layers of titania ($TiO_2$) and silica ($SiO_2$) applied by vapor deposition, to form a reflective surface with the thickness and number of the dielectric layers determined such that ultraviolet and infrared radiation will pass through, and only visible light will be reflected. The central axis of the concave reflector mirror 21 matches the long axis of the lamp 1, and the luminescent portion of the lamp 1 (where the cathode 6 and the anode 7 face each other) is located at the focal point of the concave reflector mirror 21.

The front cover 22 is made of a hard, heat-resistant glass, such as borosilicate glass. The surface of the front cover 22 can also be coated with alternating layers of titania ($TiO_2$) and silica ($SiO_2$), for example, with the thickness and number of the dielectric layers determined such that ultraviolet and infrared radiation will be reflected, and only visible light will pass through. Moreover, the front cover 22 can be attached to the front opening of the concave reflector mirror 21 using an adhesive, such as a silicon polymer adhesive.

In this embodiment, the discharge vessel 2 is heated by supplying power to the metallic wires 11, 12 from the circuit SC, which is separate from the main lighting circuit MC of the lamp 1, and which controls the metallic wires 11, 12. Therefore, at the time of ignition, the outer surface of the luminescent portion 3 will have already been raised, and the mercury vapor pressure will have increased accordingly, and so the rise of the light power following ignition will be rapid, relative to the case where the discharge vessel 2 is not heated before lighting. Moreover, by heating the discharge vessel 2 before lighting, the lamp 1 is lighted when the temperature of the luminescent portion 3 has increased and the mercury vapor pressure has increased accordingly, and so the glow discharge that occurs during ignition at room temperature is prevented. In other words, the darkening of the inner surface of the luminescent portion 3 that arises from sputtering of the cathode material due to glow discharge is prevented completely, and the reduction of light output from the lamp 1 that accompanies repeated operation is effectively suppressed.

Because the central axis of the concave reflector mirror 21 matches the long axis of the lamp 1 and the luminescent portion of the lamp 1 (where the cathode 6 and the anode 7 face each other) is located at the focal point of the concave reflector mirror 21, the light radiated from the lamp 1 can be radiated very efficiently in the direction of the front opening of the concave reflector mirror 21.

Figure 4:
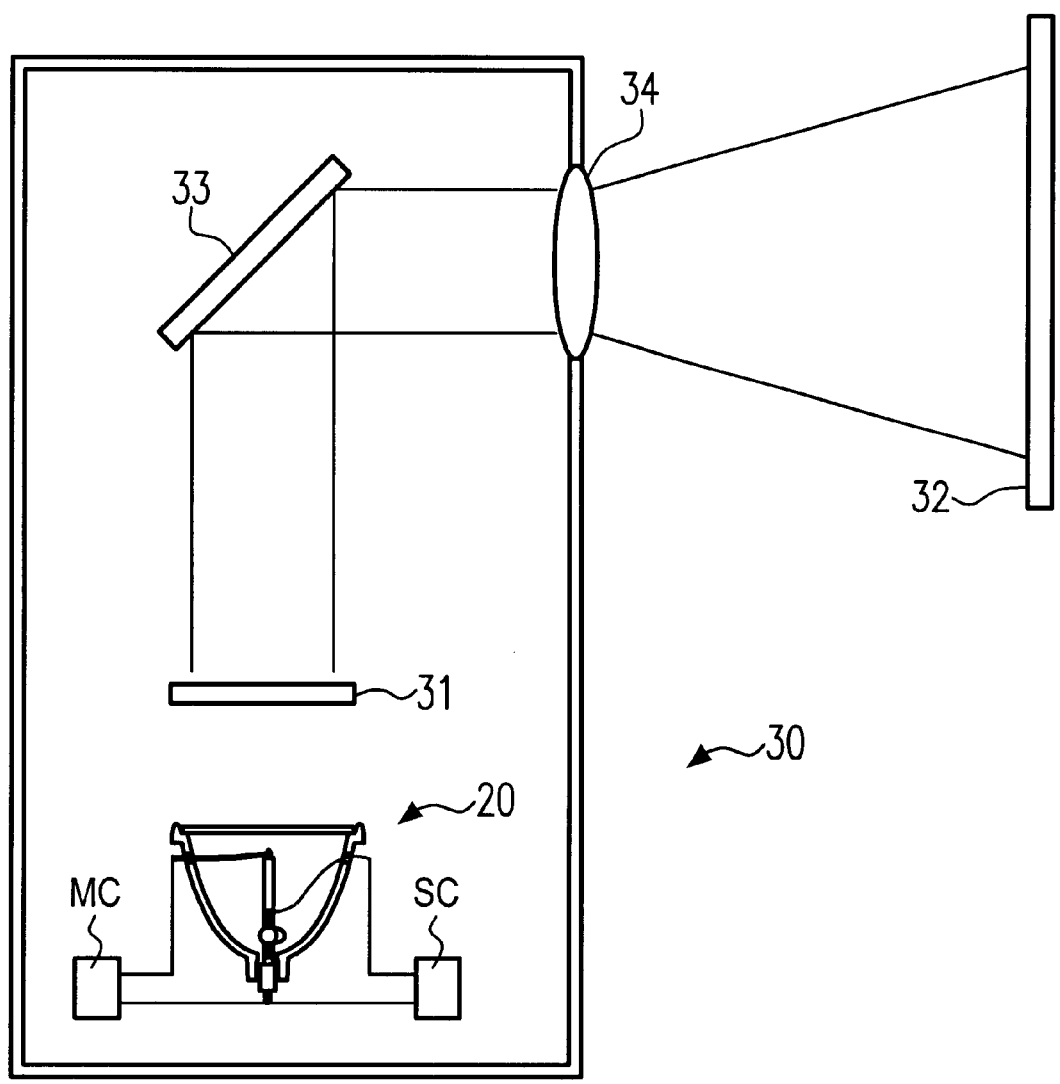
FIG. 4 is a cross-sectional view of the structure of projection-type liquid crystal display equipment using the high-pressure mercury lamp of this invention.

FIG. 4 shows the structure of projection-type liquid crystal display equipment provided with the luminescent device of this invention. The lamp unit 20 of FIG. 3 is mounted in the projection-type liquid crystal display equipment. That is, the projection-type liquid crystal display equipment 30 comprises the lamp unit 20 which has a main lighting circuit MC and a circuit SC that controls the metallic wires 11, 12 and is separate from the main lighting circuit MC, a liquid crystal display panel 31 driven by a means of driving the liquid crystal (not illustrated), and an optical system that projects the beam radiating from the lamp unit 20 through the liquid crystal display panel 31 on to the screen 32, or in other words a mirror 33 and a projector lens 34. With this structure, first the discharge vessel 2 is heated by supplying power to the metallic wires 11, 12 from the circuit SC, which controls the metallic wires 11, 12 and which is arranged in parallel to the main lighting circuit MC of the lamp 1. Then, when a thermocouple, radiant thermometer or other temperature detector (not illustrated) detects that the outer surface of the luminescent portion 3 has reached the specified temperature, 250° C., for example, the circuit SC stops supplying power to the metallic wires 11, 12, and the heating of the discharge vessel 2 ceases. Next, power is supplied to the lamp 1 by the main lighting circuit MC of the lamp 1, and the lamp 1 is ignited.

In this embodiment, the discharge vessel 2 is heated by supplying power to the metallic wires 11, 12 from the circuit SC, which is separate from the main lighting circuit MC of the lamp 1, and which controls the metallic wires 11, 12. Therefore, at the time of ignition, the outer surface of the luminescent portion 3 will have already been raised, and the mercury vapor pressure will have increased accordingly, and so the rise of the light power following ignition will be rapid, relative to the case where the discharge vessel 2 is not heated before lighting. Moreover, by heating the discharge vessel 2 before lighting, the lamp 1 is lit when the temperature of the luminescent portion 3 has increased and the mercury vapor pressure has increased accordingly, and so the glow discharge that occurs during ignition at room temperature is prevented. In other words, the darkening of the inner surface of the luminescent portion 3 that arises from sputtering of the cathode material due to glow discharge is prevented completely, and the reduction of light output from the lamp 1 that accompanies repeated operation is effectively suppressed.

Because the reduction of light output from the lamp 1 that accompanies repeated operation is effectively suppressed in the projection-type liquid crystal display equipment 30, it is possible to provide projection-type liquid crystal display equipment in which the lamp unit 20 needs to be replaced less frequently, and the maintenance burden is reduced.

A concrete explanation of the ignition device of this invention follows. The embodiment of the ignition device is explained on the basis of the circuit diagram of FIG. 6. In the figure, 101 is a high-pressure mercury lamp, metal halide lamp or other high-pressure mercury lamp (hereafter, "lamp"). A lamp power supply circuit 102 (hereafter "power supply circuit") is provided to light the lamp 101, and an activator 103 (hereafter, "starter") is located between the lamp 101 and the power supply circuit 102 and generates a high voltage that will cause dielectric breakdown between the electrodes of the lamp 101. A switch element 104 (SW) switches the supply of power to the heater, as described hereafter, attached to the lamp 101. A filter circuit 105, comprising a condenser C4 and a choke coil L2, is used to protect the switch element (SW) 104 from voltage surges in the event that the starter 103 is the high-voltage pulse type, as in this embodiment. A DC power source 106 is also provided.

The lamp 101 is of the direct-current lighting type. Its discharge vessel is made of quartz glass, and comprises a luminescent portion 113 in the shape of an elliptical bulb, a rod-shaped cathode-side seal 114 and a rod-shaped anode-side seal 115 extending from opposite sides of the luminescent portion 113.

Within the luminescent portion 113 and along the axis of the discharge vessel, the cathode 111 and anode 112 are placed facing each other with an inter-electrode distance not exceeding 2.0 mm, for example. Although not shown in the drawing, the spindle portion of the cathode 111 extends into the cathode-side seal 114, and is electrically connected to an external lead 117 through a cathode-side metallic foil 116 that is sealed within the cathode side seal 114. Similarly, the spindle portion of the anode 112 extends into the anode-side seal 115, and is electrically connected to an external lead 117 through an anode-side metallic foil 118 that is sealed within the anode side seal 115.

Mercury is sealed into the luminescent portion 113 as the luminescent substance, and a rare gas such as argon or xenon is sealed in as the ignition-starting gas. The rare gas is included at a pressure of $1.3 \times 10^3$ Pa, for example. The amount of mercury included is at least 0.15 mg/mm$^3$; that amount will provide a mercury vapor pressure well over 100 atmospheres during stable lighting.

The cathode-side seal 114 and the anode-side seal 115 are wrapped with metallic wires 119, 120 as a heater that covers all or a part of the seals 114, 115. One end of the metallic wire 120 is connected to a lead wire 122 that is connected to the switch element (SW) 104, and the other end is connected by a metallic wire 121 to one end of the metallic wire 119, the other end of which is connected to the external lead 117.

The power supply circuit 102 is primarily a step-down voltage chopper made up of an FET or other switch element (Q1), a diode (D1), a choke coil (L1) and a smoothing condenser (C1). It controls the power going to the heater (metallic wires 119, 120, 121) or to the lamp 1. The signals detected by the voltage detector V and the current detector I are input to the lamp control circuit. While power is applied to the heater, the detected signals are the basis for providing suitable voltage and current to the heater by means of control signals that are output from the lamp control circuit to the gate driver circuit that drives the switch element (Q1); during ignition and lighting, those signals cause suitable levels of lamp voltage, lamp current and lamp power to be supplied to the lamp 101.

The DC power source 106 is connected to, for example, an AC line at commercial frequency (not illustrated) and takes the voltage output by a diode bridge circuit or voltage-doubling rectifier circuit and outputs a direct current voltage smoothed by means of an active filter with a high-frequency current control function known as PFC; this is supplied to the power supply circuit 102.

The starter 103 is made up of a charging circuit R1, C2 that is charged during lamp ignition with unloaded open current from the power supply circuit 102; a transformer T1 that charges a condenser C3 through a diode D2 when the charged voltage reaches a specified level, switches on the switch element S1 and generates a stepped up oscillating voltage; and a transformer T2 that rapidly discharges through a gap G1 when the charge stored in the condenser C3 reaches a specified voltage, and generates a high-voltage pulse from several kilovolts to several tens of kilovolts on the secondary side.

Figure 6:
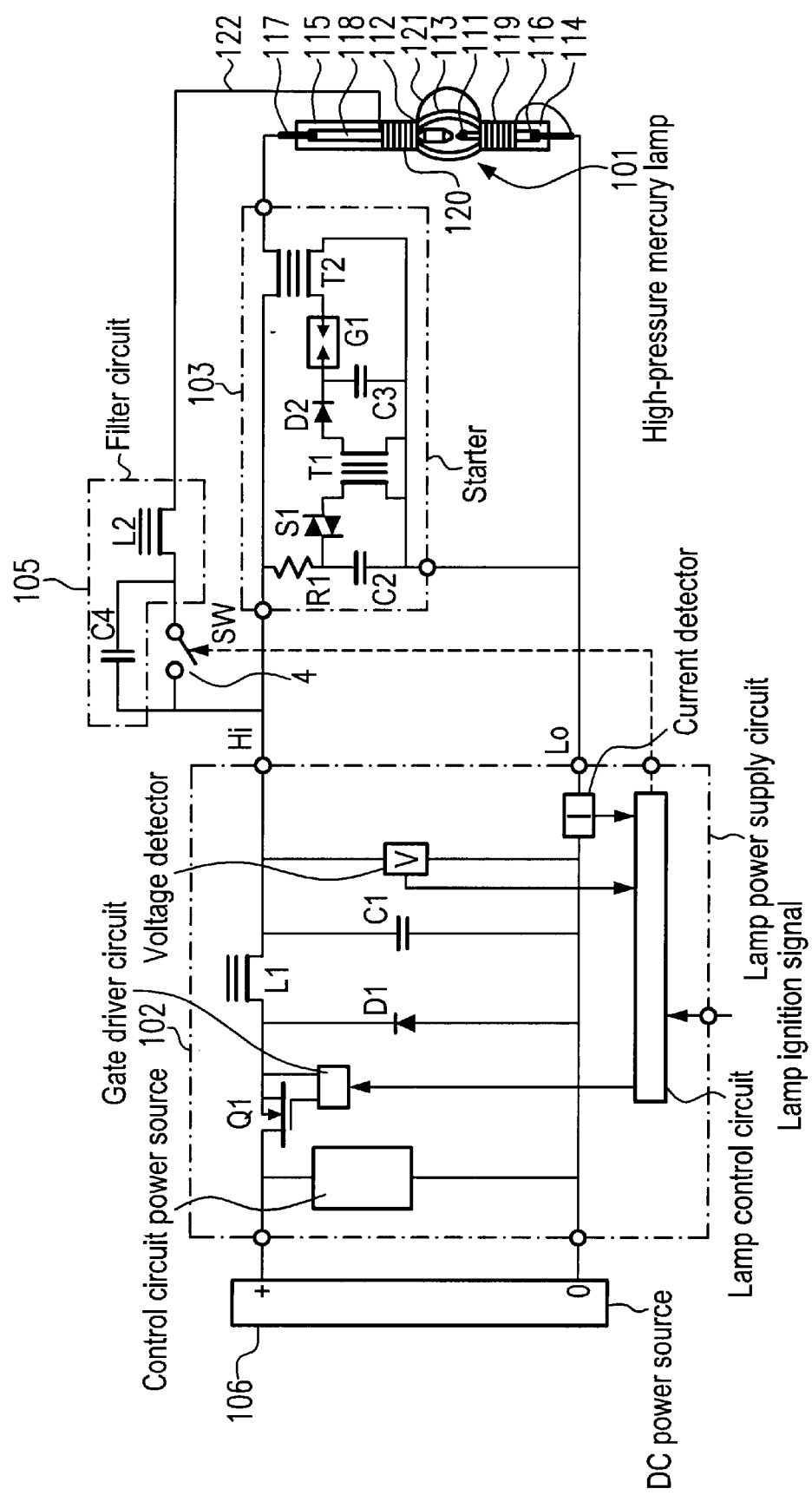
FIG. 6 is a circuit diagram of a first embodiment of the ignition device of this invention.

The action of this high-pressure mercury lamp ignition device during ignition is explained next using FIG. 6. During ignition of the lamp 101, when a lamp ignition signal is input to the lamp control circuit of the power supply circuit 102, first the switch element (SW) 104 is turned off by a command from the lamp control circuit, and power to the heater is enabled. At the same time that the switch element (SW) 104 is turned off, the heater current is supplied from the power supply circuit 102, through the switch element (SW) 104 and the choke coil (L2) to the metallic wires 119 to 121, which are the heater. Then, the heater voltage, heater current or heater power undergoes switching control by a switch element (Q1) On the basis of signals detected by the voltage detector V or the current detector I in the power supply circuit 102. Once the power to the metallic wires 119 to 121 brings the temperature of the outer surface of the luminescent portion 113 of the high pressure mercury lamp 101 to the specified level, the lamp control circuit commands the switch element (SW) 104 to open; power to the heater is stopped and heating of the discharge vessel ends. The specified temperature varies, depending on the volume of the luminescent portion, but must be at least 100° C. in any case.

After power to the heater stops, at the same time that the switch element (SW) 104 opens, the switch element (Q1) is controlled by a control signal from the lamp control circuit and the unloaded open current needed for ignition is output by the power supply circuit 102. The starter 103 is quickly activated by this input of unloaded open current, and generates a high voltage on the secondary coil of the transformer T2. This high voltage is combined with the unloaded open voltage and impressed on the lamp 101; the discharge vessel of the lamp 101 has already been warmed to a high temperature, and dielectric breakdown between the cathode 111 and the anode 112 of the lamp 101 occurs quickly. Discharge is started in accordance with the output of the power supply circuit 102, and the lamp 1 lights.

Now, because the metallic wire 121, which is the heater of the lamp 101, is located in close alignment with the luminescent portion 113, and the unloaded open current from the power supply circuit 102 is impressed on the metallic wire 121 through the filter circuit 104, it is able to function as a trigger wire, and is able to contribute to even more rapid ignition.

Thus, according to the invention, in this embodiment, by heating the outer surface of the luminescent portion 113 to at least 100° C. before the lamp 101 is lit, it is possible to vaporize the mercury within the discharge vessel in advance, to have the light output rise quickly during ignition, and to effectively prevent the undesirable glow discharge that is liable to occur during ignition.

Moreover, according to the invention, in this embodiment, the power to the heater is handled by the switch (SW) 104 to limit it to the period prior to ignition, and the supply of power from the power supply circuit 102 is switched to either the lamp 101 or the heater. Therefore, it is not necessary to have a separate circuit to heat the heater; this allows a reduction of costs.

Now, in this embodiment, a starter that generates a high-voltage pulse is used as the starter 103, but it is also possible to use a DC starter in which the voltage can be increased in steps.

Aside from an electromagnetic relay, it is possible to use an FET or other semiconductor switch element as the switch element (SW) 104.

Also, the power to the heater can be controlled by the power supply circuit 102 so that the voltage impressed on the heater is at a specified value, or it can be controlled so that the current to the heater is at a specified value. Moreover, in the event of variation of the resistance value of the heater, it is possible to control the heater power itself at a specified value, so that there will be no variation of power input to the heater. In that case, the signals from the voltage detector V and the current detector I are used for steady control of the heater power, and so it is possible to make use of the lamp power control function just as when the lamp is lit. Now, needless to say, it is necessary to switch between the appropriate power target values when controlling the heater power and when controlling the lamp power.

With regard to the timing for ending the supply of power to the heater, the time can be decided by using a thermocouple, radiant thermometer or other temperature detector (not illustrated) to determine when the temperature of the outer surface of the luminescent portion of the lamp 101 has reached the specified value, 250° C., for example. As the simplest method, it is quite practical to simply supply power for a fixed period of time. In that case, it is also possible to exert a higher level of control, such as shortening the period that power is applied in accordance to the amount of time since the lamp was last shut down, if only a short time has passed since the last use. That control is executed by the lamp control circuit of the power supply circuit 102, and is relatively complicated, but it can be realized simply by using a microprocessor chip.

Moreover, in the event that the heater is broken, the fact that the heater current is not flowing even though the heater voltage is impressed on the heater can be detected easily by the high-pressure mercury lamp ignition device, and when that is detected, time can be saved by starting up the lamp 101 immediately.

Figure 7:
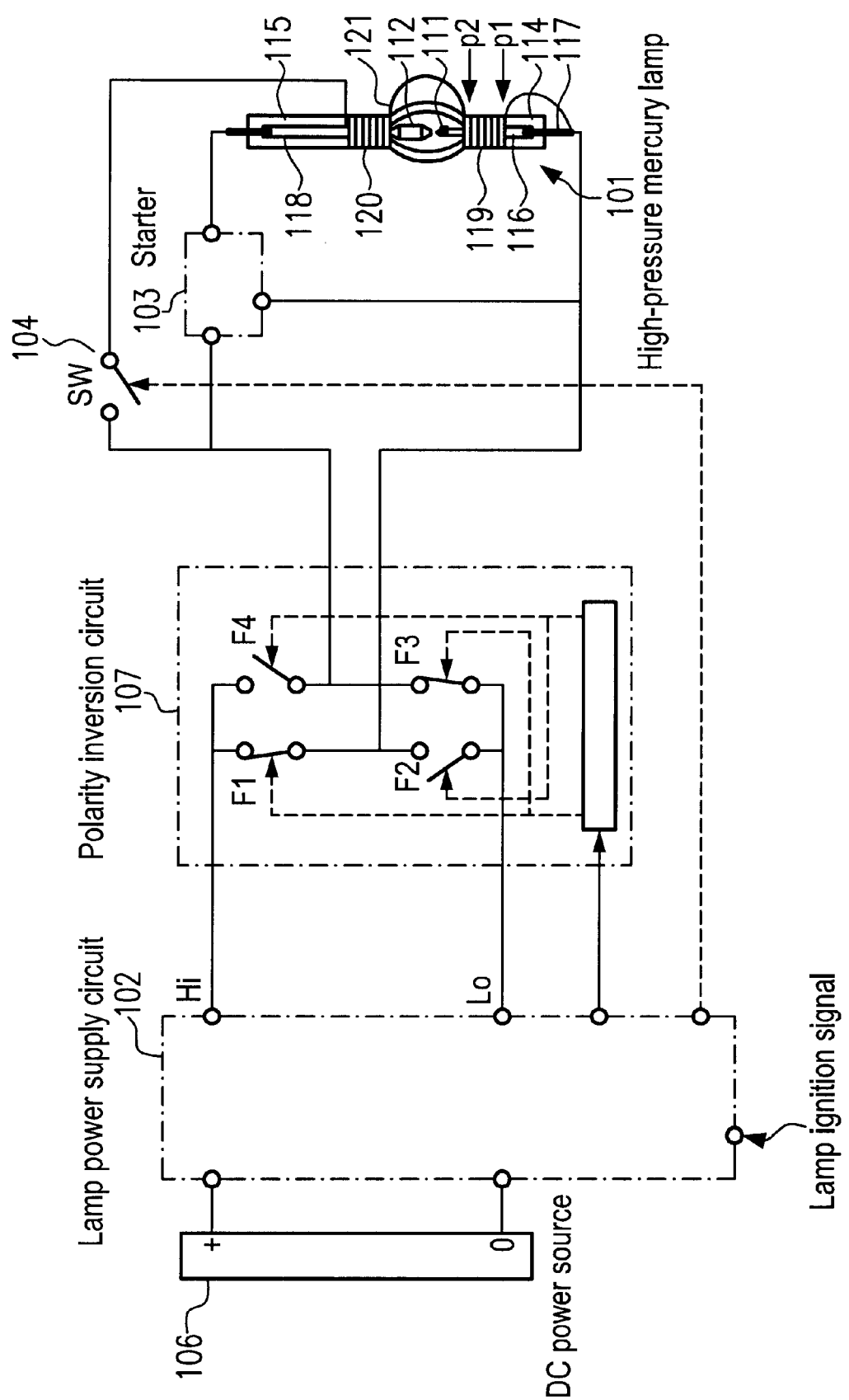
FIG. 7 is a circuit diagram of a second embodiment of the ignition device of this invention.

Next, a second embodiment of the ignition device of this invention is explained on the basis of FIG. 7.

FIG. 7 is a circuit diagram of the second embodiment of the ignition device of this invention, which 107 is a polarity inversion circuit that inverts the polarity of the voltage output from the power supply circuit 102. It comprises switch elements consisting of a switch F1, a switch F2, a switch F3 and a switch F4; semiconductor switch elements, such as FETs, are used for these switch elements. Now, other parts of the structure have the same labels and reference numerals as in FIG. 6, and their operation as a high-pressure mercury lamp ignition device is the same as in the first embodiment, so that a repeated explanation of these components is omitted.

Normally, this sort of lamp 101 has the cathode-side metallic foil 116 tightly sealed within the cathode-side seal 114, but during the lamp ignition, more alkali metal ions (such as potassium) tend to gather in the vicinity of the cathode-side metallic foil 116 than gather around the anode-side metallic foil 118. If these accumulate over a long period of time, they have an adverse effect on the tightness of the seal around the cathode-side metallic foil, and deterioration of the pressure resistance of the lamp becomes a possibility.

With the high-pressure mercury lamp ignition device of this embodiment, the problem described above is resolved by using a command from the power supply circuit 102, when power is supplied to the heater, to close the switch element (SW) 104 to send power to the heater, and at the same time, turn switch F1 and switch F3 of the polarity inversion circuit 107 on and switch F2 and F3 off, thus causing the heater current to flow in the direction from the metallic wire 119 to metallic wire 120. As a result, the electrode stem of the electrode 111 is the high potential side of the voltage impressed on the heater. But as shown in the drawing, the potential of the point p1 of the metallic wire 119 is the same as the potential of the cathode 111 because of the connection to the external lead 11. However, the potential at point p2 of the metallic wire 119 is lower than the potential of point p1 because of the voltage drop between point p1 and point p2 of the metallic wire 119. For that reason, the cathode 111 has a higher potential than point p2, and that tends to scatter the alkali metal ions in the vicinity of the cathode-side metallic foil 116.

After the completion of power to the heater, a command from the power supply circuit 102 opens the switch element (SW) 104 and stops the flow of power to the heater. At the same time, switch F4 and switch F2 of the polarity inversion circuit 102 are turned on, and switch F1 and switch F3 are turned off, which ends the supply of power from the power supply circuit 102, through switch F4 and switch F2, to the starter 103; the unloaded open current is impressed on the lamp 1, and the lamp 101 begins ignition.

Now, the technology described here can be used both in the event that the power goes to the heater when switch F1 and switch F3 are on and Switch F2 and switch F4 are off, and in the event of alternating current lighting where there is a repeated alternation between lighting the lamp 101 when switch F1 and switch F3 are off and Switch F2 and switch F4 are on, and when switch F1 and switch F3 are on and Switch F2 and switch F4 are off.

The third ignition device embodiment of this invention is explained next on the basis of FIGS. 8 through 11. In this figure, 108 is the heater power supply circuit. The high-pressure mercury lamp ignition device of this embodiment differs from that of the 1st embodiment in that there is a separate heater power supply circuit 108; the other constituent parts are labeled as in FIG. 6.

This heater power supply circuit 108 comprises a switch element (Q2) that switches the direct current voltage supplied from the DC source 106 through a transformer (T3) on a command from the heater control circuit 108 when the lamp lighting signal is input; a transformer (T3) that steps up the high frequency voltage generated by switching the switch element (Q2); the diodes D3, D4 that rectify and flatten the stepped-up voltage; a smoothing condenser C4; a heater current detector Ih that detects the heater current; and a heater voltage detector Vh that detects the heater voltage.

High-pressure mercury lamps generally suffer incomplete vaporization of the mercury within the discharge vessel directly after ignition; their mercury vapor pressure is low because of the low temperature, and their brightness is inadequate. That is because the internal inductance within the high-pressure mercury lamps is low; if one tries to inject adequate power into the high-pressure mercury lamp in that state, it is not capable of a large current flow, and it becomes necessary to increase losses in the lamp power supply circuit or to enlarge the elements. For that reason, normally, it is not possible to inject an adequate amount of power into the high-pressure mercury lamp directly after ignition, so that the lamp power supply circuit will operate within the upper limit on the amount of current that the circuit will tolerate. As a result, it takes a long time before the temperature rises in the discharge vessel, the inductance increases in the high-pressure mercury lamp, it becomes possible to inject adequate power into the high-pressure mercury lamp, and the desired light output is reached.

In liquid crystal projectors, projection-type liquid crystal display equipment, projection-type television and so on, the brightness of the lamp is slow to rise, which increases the waiting time for the user and is thus undesirable.

Accordingly, the high-pressure mercury lamp ignition device of this embodiment has a heater power supply circuit 108 that is separate from the lamp power supply circuit 102. Because the two can operate independently, during the course of igniting the lamp 101, it is possible to supply power to the heater and continue to increase the temperature within the discharge vessel. As a result, the mercury vapor pressure increases rapidly, and the brightness of the lamp 101 can increase quickly.

Moreover, with the high-pressure mercury lamp ignition device of this embodiment, the heater power supply circuit 108 is separate from the lamp power supply circuit 102, and the two can operate independently. Therefore, a variety of lighting modes are possible, as explained below on the basis of FIGS. 9 through 11.

Figure 8:
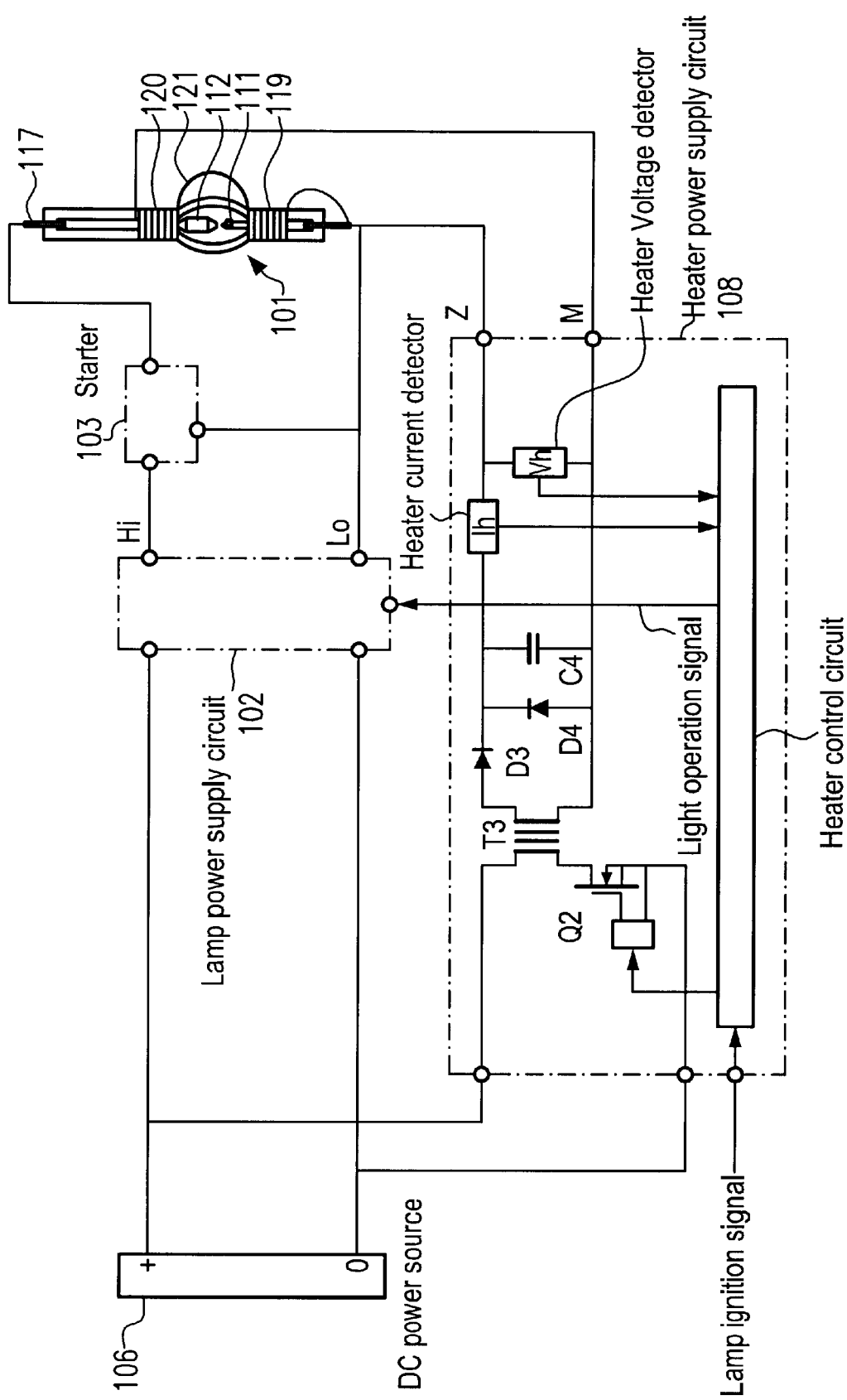
FIG. 8 is a circuit diagram of a third embodiment of the ignition device of this invention.
Figure 9A:
FIGS. 9($a$)–9($b$) are graphs of power characteristics of lamp power Wp and heater power Wh of the high-pressure mercury lamp ignition device shown in FIG. 8.
Figure 9B:
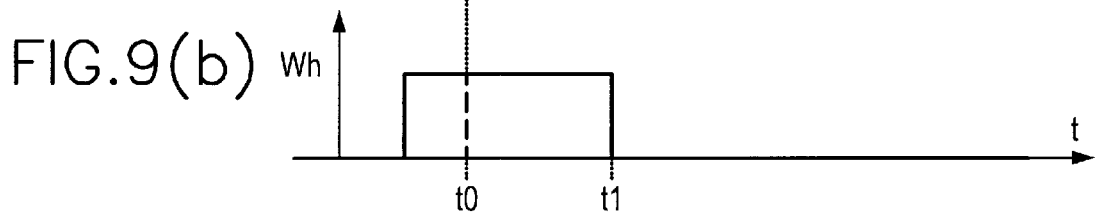

FIGS. 9(a) & 9(b) are diagrams of, respectively, the power characteristics of lamp power Wp supplied from the power supply circuit 102 to the lamp 101, and of heater power Wh supplied from the heater power supply circuit 108 to the heater, both in the high-pressure mercury lamp ignition device shown in FIG. 8. They illustrate the case of power to the heater continuing even after the ignition of the lamp 101 is underway.

In the case of the high-pressure mercury lamp ignition device in the first embodiment, the power supply circuit 102 is shared by the circuit for the supply of power to the heater, and so the supply of power to the heater is stopped at the time t0 shown by the broken line in FIG. 9. For that reason, it can be seen that the rise of lamp power Wp is slow, and a long time is required before the lamp 101 reaches the desired brightness. In the case of the high-pressure mercury lamp ignition device in the third embodiment, the supply of power to the heater continues beyond the time t0, when ignition begins, to the time t1, as shown by the solid line in FIG. 9. That is, because the heater power Wh is injected while lamp ignition is underway, the rise of the lamp power Wp can be hastened, and the time needed for the lamp 101 to reach the specified light output can be shortened.

Figure 10A:
FIGS. 10($a$)–10($b$) are graphs of other power characteristics of lamp power Wp and heater power Wh of the high-pressure mercury lamp ignition device shown in FIG. 8.
Figure 10B:
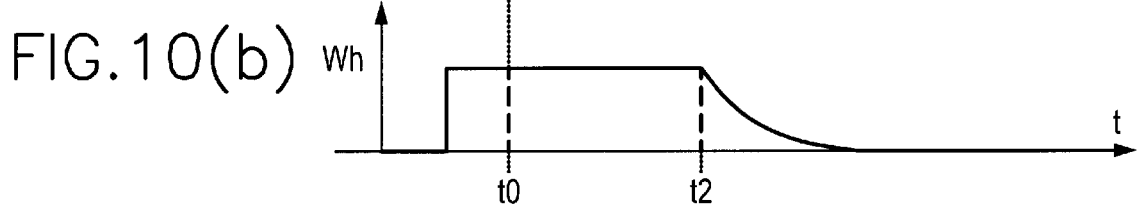

FIGS. 10(a) & 10(b) are diagrams of, respectively, the power characteristics of lamp power Wp supplied from the power supply circuit 102 to the lamp 101, and of heater power Wh supplied from the heater power supply circuit 108 to the heater, both in the high-pressure mercury lamp ignition device shown in FIG. 8. These figures illustrate the case of power continuing to the heater even after ignition of the lamp 101 is underway, but with control of the power to the heater in consideration of the power supply capacity of the DC power source 106.

When power continues to the heater after ignition has begun in the high-pressure mercury lamp ignition device shown in FIG. 8, the DC power source 106 has to supply power both to the power supply circuit 102 and the heater power supply circuit 108. For example, if the rated power of the lamp 101 is 200 W and the rated power of the heater is 100 W, and the efficiency of both the power supply circuit 102 and the heater power supply circuit 108 is 90%, the DC power source 106 must be capable of providing a total of 333 W, or 222 W for the power supply circuit 102 and 111 W for the heater power supply circuit 108. However, the period during which it is necessary to supply power to the heater is, at the longest, the several minutes until the lamp reaches normal brightness. That is, it is not the best policy to build in a capability to supply 333 W for several minutes, at the most, when ultimately it will be enough to be able to supply 222 W to the power supply circuit 102.

Therefore, in this high-pressure mercury lamp ignition device, it is possible to limit the total power supplied to the power supply circuit 102 and the heater power supply circuit 108 to 222 W, for example, by controlling the heater power Wh from the heater power supply circuit 108 so that the total value does not exceed that range; the heater power Wh is controlled such that it diminishes as the lamp power Wp increases.

If the power that the DC power source 106 supplies to the power supply circuit 102 and to the heater power supply circuit 108 is controlled in this way, during the initial period of power to the heater, the rated power of the heater Wh is input from the DC power source 106, and so the time until the brightness of the lamp 101 reaches a practical output is barely changed, and the time until the final, normal brightness is reached is lengthened only a little. On the other hand, to the extent that it is possible to hold down the power supply capacity of the DC power source 106, it is possible to obtain a great advantage in terms of reducing the cost, since the size and weight of the equipment can be reduced.

Figure 11A:
FIGS. 11($a$)–11($b$) are graphs of further power characteristics of lamp power Wp and heater power Wh of the high-pressure mercury lamp ignition device shown in FIG. 8.
Figure 11B:
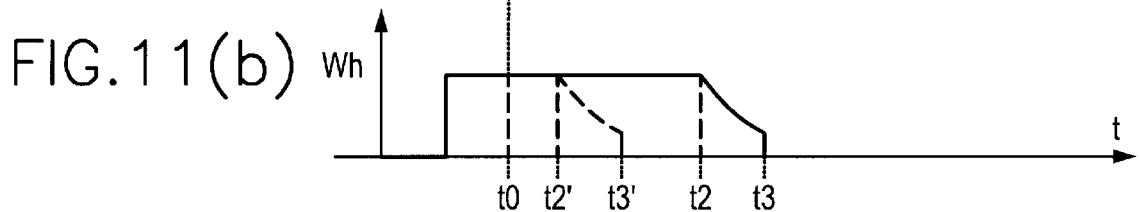

FIGS. 11(a) & 11(b) are diagrams of, respectively, the power characteristics of lamp power Wp supplied from the power supply circuit 102 to the lamp 101, and of heater power Wh supplied from the heater power supply circuit 108 to the heater, both in the high-pressure mercury lamp ignition device shown in FIG. 8, in the case where power is supplied to the heater after ignition of the lamp 101 is underway, but the power to the heater is controlled in response to the temperature of the lamp.

In the high-pressure mercury lamp ignition device of this embodiment, the basic function of the heater is to raise the temperature of the lamp, so power is input to it as the temperature of the lamp 101 is measured, and when the lamp 101 reaches the specified temperature, that fact is detected and power to the heater is stopped. In the high-pressure mercury lamp ignition device of this embodiment, when the lamp 101 is ignited from the cold state, the power characteristics are as shown by the solid line in FIGS. 11(a) & 11(b); the power to the heater begins to be reduced at time t2, and power to the heater is stopped at time t3. However, in the event that the lamp 101 is re-lit a relatively short time after being extinguished, the power characteristics are as shown by the broken line in FIGS. 11(a) & 11(b); the power to the heater begins to be reduced at time t2', and power to the heater is stopped at time t3'.

Thus by means of this embodiment of the invention, when the lamp 101 is started up from a cold state as usual, it is controlled to supply the usual amount of power to the heater, and when the lamp 101 is re-ignited a relatively short time after being turned off, power is supplied to the heater for a short time, or not at all. This suppresses wasted power consumption, and prevents deterioration of heater service life from burn out or oxidation due to excessive heating.

Now, in the high-pressure mercury lamp ignition device of this embodiment, the means of measuring the lamp temperature could be placement of a thermocouple or other temperature sensor near the heater, or use of an infrared radiant thermometer that detects the temperature near the heater. To further reduce costs, however, it is possible to use the method of estimating the temperature from the measured value of electrical resistance of the heater, taking advantage of the characteristic of resistors that the electrical resistance value increases as the temperature rises. In that case, the electrical resistance of the heater can be measured easily by measuring the voltage and current values of the heater, using the heater current detector Ih and the heater voltage detector Vh of the heater power supply circuit 108.

Another means of measuring the lamp temperature, instead of calculating the electrical resistance value and the temperature value as described above, is to obtain data on the lamp temperature from the detected heater voltage and heater current, determine conditions for stopping the power to the heater based on that data, and then stop the power to the heater based on information indirectly related to the temperature of the heater.

Thus, in the event that the high-pressure mercury lamp ignition device of this embodiment, with ignition as shown in FIGS. 9 through 11, is used in a liquid crystal projector, projection-type liquid crystal display equipment or a projection-type television, it is possible to reduce waiting time for the user, and consequently to realize highly superior projection equipment.

Figure 12:
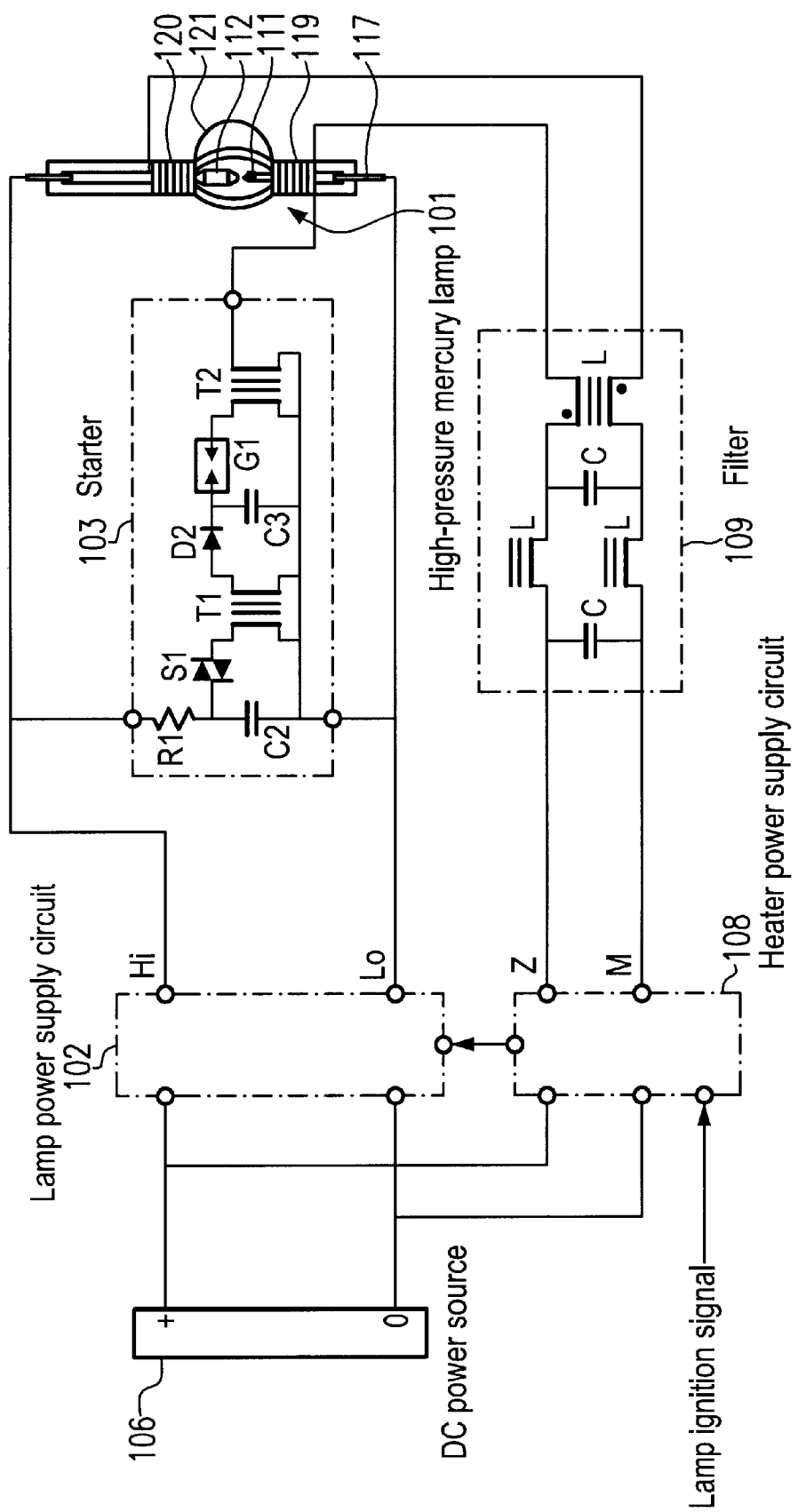
FIG. 12 is a circuit diagram of fourth embodiment of the ignition device of this invention.

The fourth embodiment of the ignition device of this invention is explained next on the basis of the circuit diagram shown in FIG. 12, in which 109 is a filter circuit that keeps the high voltage output by the starter 103 from being impressed on the heater power supply circuit 106.

The high-pressure mercury lamp ignition device of this embodiment differs from that of the third embodiment in that the high voltage output by the starter 103 is impressed on the cathode-side lead 117 of the lamp 101 and the heater (metallic wires 119 to 121), and in that there is a filter circuit 109 so that the high voltage impressed on the heater (metallic wires 119 to 121) is not bypassed in the heater power supply circuit 108.

As shown in the drawing, this high-pressure mercury lamp ignition device is constituted such that, during ignition, the high voltage generated by the starter 103 is impressed on the metallic wires 119 to 121 which make up the heater. The metallic wires 119 and 120 are wrapped around the cathode-side seal 113 and the anode-side seal 115 respectively, and the metallic wire 121 is located along the outer surface of the luminescent portion 113. Therefore, the high voltage is impressed across the discharge space, through the discharge vessel, and it is possible to induce dielectric breakdown in the discharge space by means of what is called dielectric barrier discharge.

In the high-pressure mercury lamp ignition device of this embodiment, following the completion of ignition, the lamp current of the lamp 101 can be kept from flowing in the secondary coil of the step-up transformer T2 of the starter 103, and so it is possible to use fine wire in the secondary coil of the step-up transformer T2 of the starter 103. It is thus possible to reduce the weight and size of the transformer T2.

Moreover, because of the filter circuit 109, the high voltage from the starter 103 is impressed on the metallic wires 119 to 121 of the heater; this makes it possible to prevent false operations within the heater power supply circuit 108, and damage to its elements.

While not illustrated, the cathode-side terminal of the metallic wire 119 is directly connected to the cathode 111 only during the period of heater heating during ignition, and the heater voltage is impressed so that the cathode 111 side is at a high potential. For that reason, as was stated previously, the electrode stem of the cathode 111 has a high potential relative to the facing portion of the metallic wire 119, and it is possible to prevent deterioration of the pressure resistance of the lamp 101.

What is claimed is:

1. A high-pressure mercury lamp luminescent device comprising a pair of electrodes located opposite one another within a discharge vessel made of quartz glass with a luminescent portion, seals being formed on opposite ends of the luminescent portion and at least 0.15 mg/mm$^3$ of mercury sealed in the discharge vessel, a conductive heater wrapped around the seals of the discharge vessel and a means of passing electricity through the conductive heater for controlling the temperature of an outer wall of the luminescent portion of the discharge vessel at or above a desired temperature before the high-pressure mercury lamp is lit.

2. The high-pressure mercury lamp luminescent device as described in claim 1, in which the conductive heater wrapped around the seals is connected by a metallic wire that straddles the luminescent portion of the discharge vessel; and wherein the conductive heater is connected electrically to an external lead of the high-pressure mercury lamp.

3. The high-pressure mercury lamp luminescent device as described in claim 2, wherein the external lead to which the conductive heater is connected is the external lead on a cathode side of the high-pressure mercury lamp.

4. A high-pressure mercury lamp luminescent device comprising a cathode and an anode located opposite one another within a discharge vessel made of quartz glass with a luminescent portion, seals formed on opposite ends of the luminescent portion and at least 0.15 mg/mm$^3$ of mercury sealed in the discharge vessel, and means of increasing the temperature of the outer wall of the luminescent portion of the discharge vessel to at least 100° C. before the high-pressure mercury lamp is lit.

5. The high-pressure mercury lamp luminescent device as described in claim 4, further comprising is a lamp power supply circuit to ignite the high-pressure mercury lamp; wherein said means of increasing the temperature of the outer wall of the luminescent portion of the discharge vessel is a heater; and wherein power is supplied to the heater by said lamp power supply circuit.

6. The high-pressure mercury lamp luminescent device as described in claim 5, wherein the heater is wrapped around at least a cathode side one of the seals; wherein a first end of the heater faces the cathode through the seal, and second end of the heater is connected electrically to the cathode; and wherein, when power is supplied to the heater, a high potential side of the heater voltage is impressed on the second end of the heater.

7. The high-pressure mercury lamp luminescent device as described in claim 5, wherein said heater is operable before and during lighting of the high-pressure mercury lamp.

8. The high-pressure mercury lamp luminescent device as described in claim 7, wherein the lamp power supply circuit and a heater power supply circuit are connected to the same power source; and wherein the heater power supply circuit is controlled such that total power output of the lamp and heater power supply circuits does not exceed a specified value.

9. The high-pressure mercury lamp luminescent device as described in claim 5, further comprising a means for detecting the temperature of the luminescent portion and for stopping power to the heater when the temperature passes a specified value.

10. A high-pressure mercury lamp luminescent device comprising:

a discharge vessel made of quartz glass with a luminescent portion;

a pair of electrodes located opposite one another within the discharge vessel;

a pair of seals formed on opposite ends of the luminescent portion with at least 0.15 mg/mm$^3$ of mercury sealed in the discharge vessel;

a conductive heater wrapped around the seals of the discharge vessel;

means for passing electricity through the conductive heater for controlling the temperature of an outer wall of the luminescent portion of the discharge vessel at or above a desired temperature before the high-pressure mercury lamp is lit; and means for increasing the temperature of the outer wall of the luminescent portion of the discharge vessel to at least 100° C. before the high-pressure mercury lamp is lit.

* * * * *